Jan. 19, 1926.

A. M. WISWELL

AUTOMOBILE LOCK

Filed Oct. 23, 1924

1,570,366

INVENTOR
A. M. WISWELL
By C. B. Birkenbeuel
HIS ATTORNEY

Patented Jan. 19, 1926.

1,570,366

UNITED STATES PATENT OFFICE.

ARTHUR M. WISWELL, OF PORTLAND, OREGON.

AUTOMOBILE LOCK.

Application filed October 23, 1924. Serial No. 745,338.

*To all whom it may concern:*

Be it hereby known that I, ARTHUR M. WISWELL, a citizen of the United States, and a resident of Portland, in the county of Multnomah and State of Oregon, have invented a new and useful Improvement in an Automobile Lock, of which the following is a specification.

This invention relates generally to the automotive industry and particularly to devices for automatically locking an automobile against unauthorized use.

The first object of my invention is the production of an exceedingly simple and efficient automobile lock which automatically locks an automobile after the lapse of a predetermined space of time from the time the engine is stopped.

A second object is to enable him to lock his car with a key if he desires and to unlock it at any time with the same key.

A third object is to so construct my device that the instant the car is locked it will set a protected alarm which will be sounded whenever the car is moved.

These and other objects will become more apparent from the specifications following and from the accompanying drawing in which.

Figure 2:
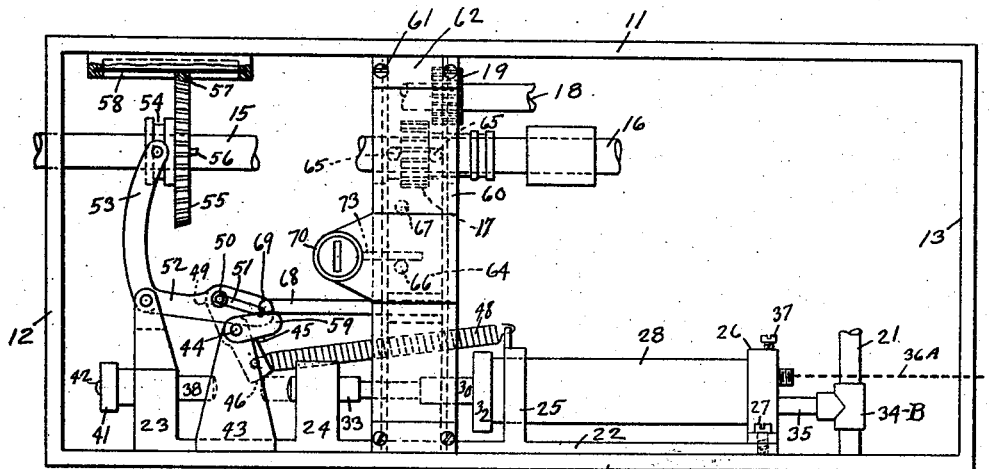
Figure 2, is a plan of the device with the cover removed, showing the parts in the locked position.

The drawing is largely diagrammatic. A box like container, for instance, is used to represent a transmission case and a pair of unmeshed gears are indicated as the gears of a transmission in a neutral position.

Similar numbers of reference refer to the same parts throughout the views.

Referring in detail to the drawings, I have illustrated a rectangular box, consisting of a front 10, a back 11 and ends 12 and 13. A top or cover 14 is also indicated. The foregoing parts correspond with the transmission case of an automobile whose usual working parts are omitted with the exception of a shaft 15 corresponding with the speedometer drive shaft and the propeller shaft 16 with the sliding gear 17 and the secondary shaft 18, with its gear 19.

The usual geared oil pump 20 is shown, and also the pipe 21, which leads to the various points to be lubricated.

Referring more particularly to my device, I have constructed a base 22, which is mounted on the inner side of the front 10. On the base 22, are formed the standards 23, 24 and 25 and to one end is secured the standard 26 by means of the screws 27.

The standards 25 and 26, support a cylinder 28, one end of which is closed by the standard 26.

A piston 29 having a tubular piston rod 30, is contained within the cylinder 28. A compression spring 31, is confined in the cylinder 28 by the cap 32 and this spring urges the piston 29 toward the standard 26.

Guided in the standard 24 is a rod 33, which has its major portion 34 reduced in diameter to enable it to freely enter the tube 30, which is the same diameter as the rod 33. A nut 34$^A$ is placed on the end of the rod 33. The pipe 21 is provided with a T 34$^B$, from which a pipe 35 leads into the cylinder 28 through the standard 26.

A hole 36 passes through the standard 26 and the screw 37, controls the speed at which oil can be forced out of the cylinder 28, by means of the spring 31.

In the standard 23 is placed the plunger 38, whose spring 39, on its shank 40, is confined by the cap 41. A head 42 is formed on the end of the shank 40 to prevent its complete ejection.

On the base 10 are formed the standards 43, which carry the vertical rocker shaft 44. Secured on the shaft 44 is an arm 45, whose end 46 is an arc struck from the center of the shaft 44. A pin 47, is provided near the end 46 for the spring 48 whose end is attached to the standard 25. The end 49 of the arm 45 is provided with a rivet 50, which works freely in the slot 51 in the double arm 52 which pivots on the standard 23 and whose forked end 53 engages the groove 54 in the slidable toothed wheel 55, which is driven through a spline 56 on the shaft 15.

The teeth on the wheel 55 can be brought into engagement with the hardened button 57 on the diaphragm 58 by merely sliding the wheel 55 along the shaft 15.

On the under end of the shaft 44 is secured an arm 59, by means of which the shaft 44 is rocked.

Between the sides 10 and 11, I have placed a bridge 60, which is held in place by means of the screws 61 in the flanges 62. On the underside of the bridge 60 are formed the dovetailed guides 63 between which is slidably held the slide 64 which carries the two pins 65 adapted to straddle the gear 17 when in its neutral position. The slide 64 also carries the two spaced pins 66 and 67 and a laterally extending arm 68 whose turned end 69 can touch the side of the arm 59.

A lock 70 is mounted on the bridge 60 and its key 71 rotates the shaft 72 from which projects the arm 73 which operates between the pins 66 and 67.

The operation of my device is as follows:

When the driver of an automobile equipped with this device desires to start his car, he inserts his key 71 in the lock and unlocks the transmission as he would with any transmission or neutral lock, and starts his engine.

The oil pump 20 now raises the pressure in the cylinder 28, which compresses the spring 31 and forces the tube 30 out of the cylinder against the shoulder on the rod 33 which is in turn forced through the standard 24 against the plunger 38 which is holding the end 46 of the arm 45 out of the path of the member 33. The end 46 now rests on the member 33 instead of on the member 38.

Figure 4:
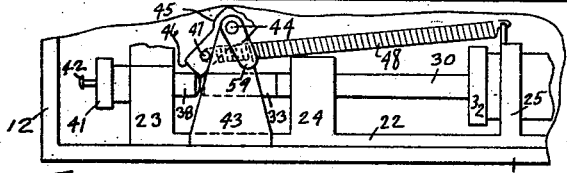
Figure 4 is a fragmentary plan showing the parts just at the moment the unlocking operation has begun.
Figure 1:
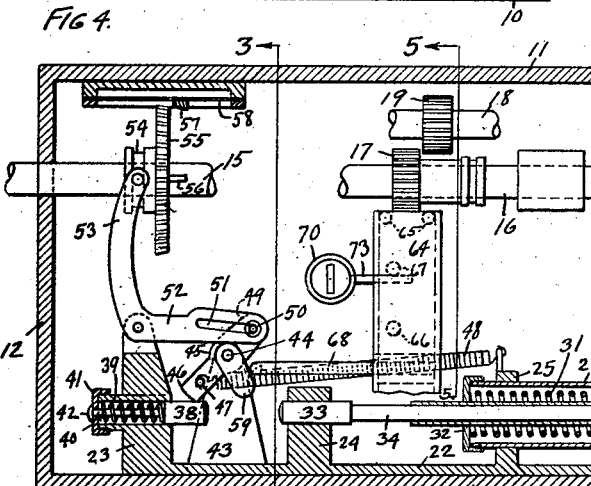
Figure 1, is a horizontal section of my device taken along the line 1—1 in Figure 3, showing the parts in an unlocked position.
Figure 5:
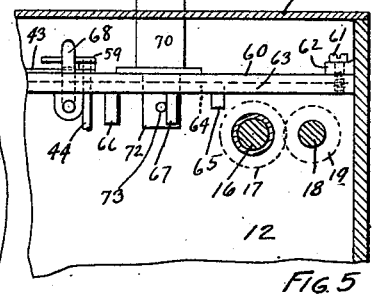
Figure 5 is a fragmentary transverse section taken along the line 5—5 in Figure 1.
Figure 3:
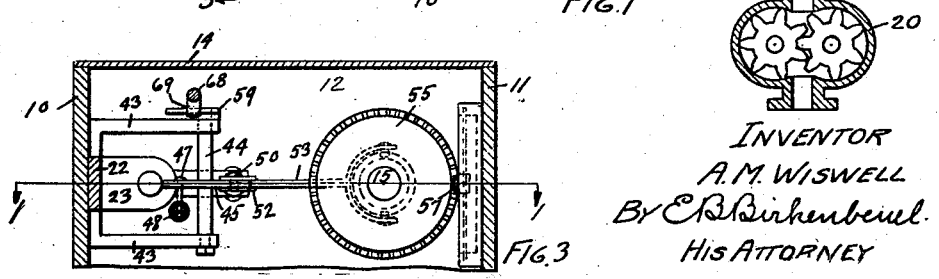
Figure 3, is a transverse section taken along the line 3—3 in Figure 1.

It will be observed that these positions are shown in Figures 1 and 4, namely the unlocked position.

Now let us suppose that the driver stops his engine and leaves his car, forgetting to lock the transmission with his key. When the engine stops the pump 20 also stops and pressure in the pipe 21 drops to zero. The oil is now forced out of the cylinder 28 by the spring 31, through the opening 36 and merely passes to the bottom of the crank case through the pipe 36^A shown in dotted lines. Any oil which may leak past the piston or between the rod 34 and the tube 30, may also be drained to the crank case if desired. When the piston 29 touches the nut 34^A it begins to withdraw the rod 33 from under the arm end 46 until it takes the locked position shown in Figure 2. In moving to the position shown in Fig. 2, the arm 59 forces the arm 68 with its attached slide 64 to lock the transmission. The rapidity with which the locking operation takes place is controlled by the setting of the screw 37. The alarm is also set so that any movement of the speedometer shaft will sound the horn.

Before the car can be again driven under its own power, it must be unlocked with the key 71 which causes the slide 64 to be withdrawn and the parts to assume the position shown in Figure 1.

I am aware that many forms of automobile locks have been constructed in the past; I therefore do not claim such devices broadly but I do intend to cover such forms and modifications as fall fairly within the following claims:—

1. A lock actuating mechanism for transmission locks, consisting of a frame; a cylinder mounted on said frame; a piston in said cylinder, motor actuated means for delivering oil to said cylinder; a spring behind said piston adapted to expel the oil from said cylinder when the oil delivery ceases; a rod on said piston; a spring urged plunger in the path of said rod; a rocker shaft; an arm on said shaft whose end can swing in the path of said plunger and piston rod; a transmission lock; a bolt operable by said lock and connection means between said bolt and arm adapted to rest said arm on said plunger when said bolt is withdrawn and to limit the movement of said piston rod when said bolt is set to lock a transmission.

2. An automobile lock having in combination a transmission lock, and a lock actuating device adapted to lock said lock when the engine is stopped, said actuating device consisting of a cylinder; a piston in said cylinder; pipes for supplying oil to said cylinder from the oil pump of the motor, said piston having connections to said lock adapted to lock the transmission gears when said oil pump ceases to function.

ARTHUR M. WISWELL.